United States Patent [19]
Robertson, Jr. et al.

[11] Patent Number: 6,071,640
[45] Date of Patent: Jun. 6, 2000

[54] BATTERY MOUNTING ASSEMBLY FOR A RADIO

[75] Inventors: William H. Robertson, Jr., Plantation; Michael H. Brannan, Sunrise; Sam Hosseini, Weston, all of Fla.

[73] Assignee: Motorola, Inc., Schaumburg, Ill.

[21] Appl. No.: 09/185,294

[22] Filed: Nov. 3, 1998

[51] Int. Cl.⁷ ........................................ H01M 2/10

[52] U.S. Cl. ............................ 429/100; 429/99; 429/121; 361/814

[58] Field of Search ................... 429/100, 123, 429/99, 96; 361/814

[56] References Cited

U.S. PATENT DOCUMENTS 5,607,791  3/1997  Garcia et al. .................. 429/121 X

*Primary Examiner*—John S. Maples
*Attorney, Agent, or Firm*—Barbara R. Doutre

[57] ABSTRACT

A battery mounting assembly for a radio (100) includes a radio housing and a back cover (102, 104). The radio housing (102) has front and back surfaces (108, 110) with retaining posts (122) extending from the back surface (110). A battery pack (106) has through-holes (120) which correspond and mate with the retaining posts (122) to retain the battery pack against the back surface (110). The back cover (104) slides along the radio housing (102) to compressibly retain the battery pack (106) against the radio housing.

5 Claims, 2 Drawing Sheets

BATTERY MOUNTING ASSEMBLY FOR A RADIO

This application is related to application CM01773K entitled "Battery Mounting Assembly for a Radio" by Michael J. Slipy, William H. Robertson Jr., and Sam Hosseini being filed concurrently herewith.

TECHNICAL FIELD

This invention relates in general to portable radios and more specifically to the battery mounting assemblies for such radios.

BACKGROUND

There is a growing interest among consumers for very small, lightweight communications products, such as cellular telephones and two-way radios. These types of products typically call for easy to assemble and disassemble battery packs. Once inserted, it is important that the battery pack maintain proper contact with the radio. Intermittent contact can cause loss of communications and is usually caused by improper battery alignment and faulty retention mechanisms. A variety of mechanical hardware can be used to improve battery alignment and contact reliability such as slots, screws, clamps, and straps. However, an overabundance of complex hardware can cause an individual to become frustrated with the radio. Today's radio users want fast, easy battery replacement.

Accordingly, there is a need for an improved battery mounting assembly for a radio.

DETAILED DESCRIPTION OF THE PREFERRED EMBODIMENT

Figure 1:
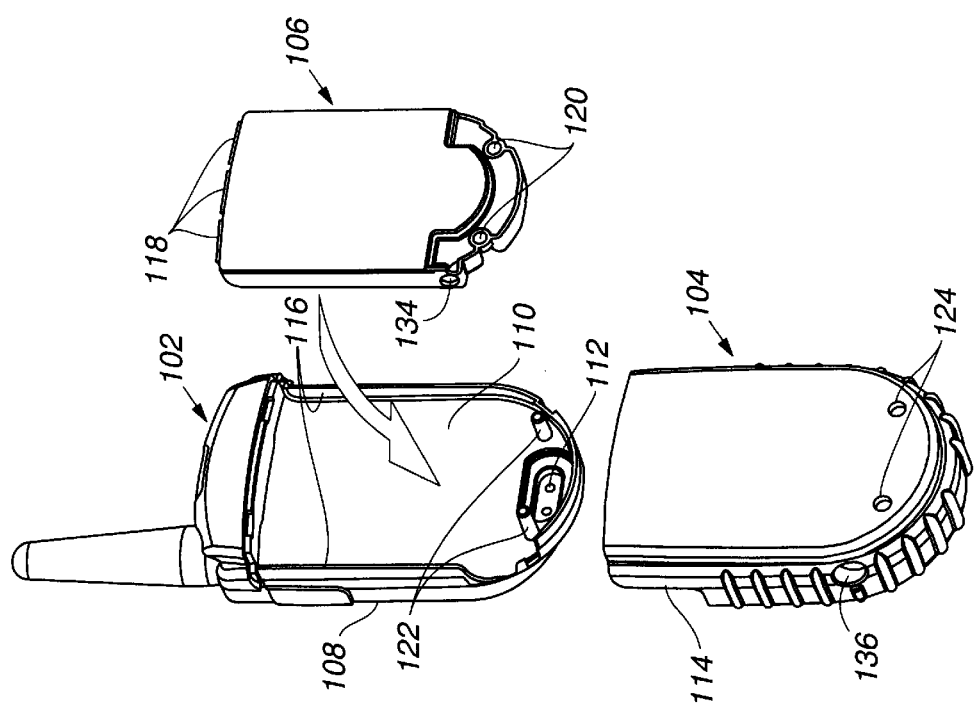
FIG. 1 is an exploded view of a battery mounting assembly for a radio in accordance with the present invention.

FIG. 1 is an exploded view of a battery mounting assembly for a radio in accordance with the present invention. Included in assembly 100 is a housing having first and second housing portions 102, 104 and a battery pack 106. The first housing portion 102 will also be referred to as front housing portion 102 and radio housing 102. The second housing portion 104 will also be referred to as back housing portion 104 and back cover 104. The front housing portion 102 has front and back surfaces 108, 110 with radio electronics contained therein (not shown). In accordance with the present invention, front housing portion 102 includes at least one retaining post, preferably two, 122 extending from the back surface 110. Battery contacts 112 are located on the back surface 110 to provide electrical interconnection with mating contacts (not shown) of the battery pack 106. Front housing portion 102 preferably includes retaining walls 116 extending along a predetermined portion of the back surface 110. Retaining walls 116 also provide guide rails for the back housing 104. Back housing 104 includes sidewalls 114 for slideably coupling to the retaining walls 116 of the front housing portion 102.

In the preferred embodiment of the invention, front and back housing portions 102, 104 and battery pack 106 are all formed of similarly shaped curved bottom surfaces. Battery pack 106 includes rechargeable cells 118 preferably packaged to conform to the curved bottom surface of the front and back housing portions 102, 104. In accordance with the present invention, the battery pack 106 includes at least one through-hole, here shown as first and second through-holes, 120 which correspond and mate to the two retaining posts 122. The number of through-holes and corresponding retaining posts can be varied if desired. Battery pack 106 further includes a charging input 134 and second housing portion 104 includes an opening 136 for providing access to this charging input.

Figure 2:
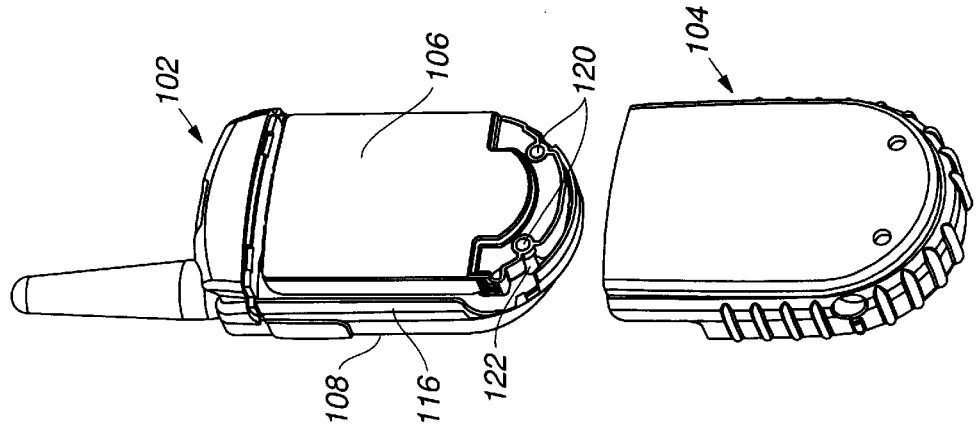
FIG. 2 is a partially assembled view of the battery mounting assembly of FIG. 1 in accordance with the present invention.
Figure 4:
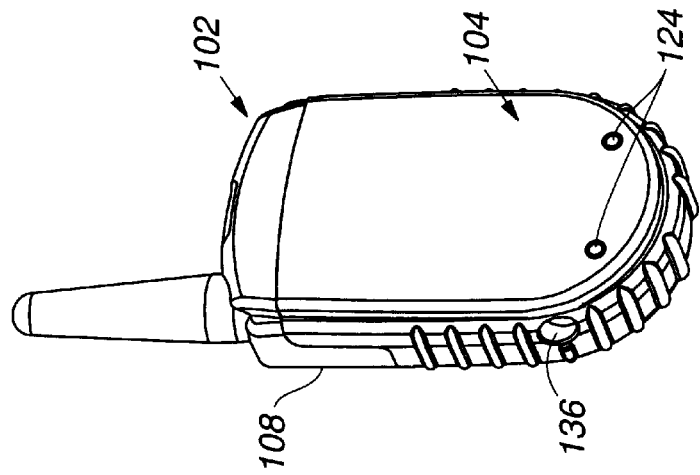
FIG. 4 shows the completed assembly of the battery mounting assembly of FIG. 1 in accordance with the present invention.
Figure 3:
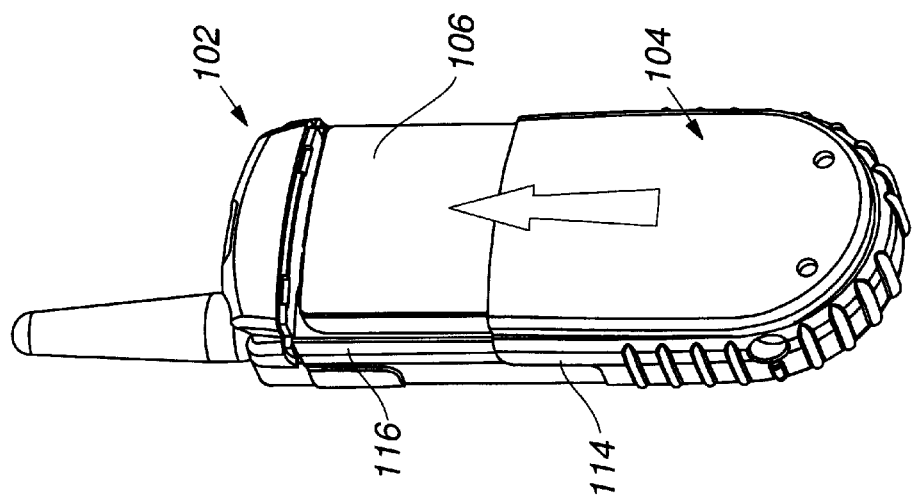
FIG. 3 is another partially assembled view of the battery mounting assembly of FIG. 1 in accordance with the present invention.

FIGS. 2, 3, and 4 show the steps of assembling the battery mounting assembly 100 of the present invention. In accordance with the present invention, FIG. 2 shows through-holes 120 aligned and mated with the corresponding retaining posts 122 such that the battery pack 106 is retained against the back surface 110 of the front housing portion 102. Retention walls 116 minimize any side-to-side movement of the battery pack 106. Through-holes 120, corresponding retaining posts 122, and retention walls 116 provide improved contact alignment for the battery mounting assembly 100 of the present invention.

FIG. 3 shows the back housing portion 104 of the present invention slideably coupling to the front housing portion 102. The side walls 114 of back housing portion 104 slide along the retention walls 116 of the front housing portion 102 so as to enclose the battery pack 106. The back housing portion 104 operates as a back cover that compressibly retains the battery pack 106 against the radio housing 102 to provide improved electrical contact. The completed assembly is shown in FIG. 4 with the radio housing 102 and back cover 104. Once the assembly 100 is completed the opening 136 aligns with charging input 134 so that the battery pack 106 can be charged. To disassemble, one need only pull down on the back cover 104 and remove the battery pack 106.

For additional retention, the back housing portion 104 may also include apertures 124 which correspond and align with the retaining posts 122 to provide a snap fit. The retaining posts 122 preferably protrude into these apertures by some predetermined amount sufficient to provide improved retention but still allowing a user to disassemble the radio by simply pulling downward on the back cover 104.

Accordingly, there has been provided an improved battery mounting assembly for a radio which allows assembly and disassembly without the use of straps, screws, or other superfluous hardware. The combination of battery pack through-holes 120, retaining posts 122, and slideable back cover 104 provide the benefit of simple assembly and disassembly along with the advantages of improved alignment and contact.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A battery mounting assembly for a radio, comprising:

a housing having first and second housing portions;

at least one retaining post extending from the first housing portion;

a battery pack having at least one through-hole for aligning and mating with the at least one retaining post; and the second housing portion slideably coupling to the first housing portion to enclose and compressibly retain the battery pack.

2. The assembly of claim 1, further comprising retaining walls extending from the second housing portion and within which the battery pack is received.

3. A battery mounting assembly for a radio, comprising:

front and back housing portions, the front housing portion having front and back surfaces, the back surface having a plurality of retaining posts and retaining walls extending therefrom;

a battery pack having a plurality of through-holes formed therethrough, the battery pack through-holes aligning and corresponding with the plurality of retaining posts such that the battery pack sits within the retaining walls of the back surface of the front housing portion; and the back housing portion slideably coupling to the front housing portion to retain the battery pack therebetween.

4. The assembly of claim 3, wherein the back housing portion includes a plurality of apertures corresponding to the retaining posts to provide a snap fit.

5. A battery assembly for a radio, comprising:

a radio housing and back cover, the radio housing having front and back surfaces, the back surface having first and second alignment posts extending therefrom;

a battery pack having first and second through-holes formed therein, the first and second retaining posts of the back surface aligning and mating with the first and second through-holes so as to retain the battery pack against the back surface of the radio housing; and a back cover for slideably coupling to the radio housing and compressibly retaining the battery pack against the back surface of the radio housing.

* * * * *